United States Patent
Kimura et al.

(10) Patent No.: US 7,130,611 B2
(45) Date of Patent: Oct. 31, 2006

(54) MOVING STATUS INFORMATION PROVIDING METHOD AND SERVER

(75) Inventors: Keisuke Kimura, Hino (JP); Hiroyuki Yamamoto, Tokyo (JP); Aki Kariya, Ichikawa (JP); Katsutoshi Murata, Kunitachi (JP); Atsushi Odakura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 419 days.

(21) Appl. No.: 10/311,640

(22) PCT Filed: Nov. 16, 2001

(86) PCT No.: PCT/JP01/10047

§ 371 (c)(1),
(2), (4) Date: Dec. 17, 2002

(87) PCT Pub. No.: WO02/41205

PCT Pub. Date: May 23, 2002

(65) Prior Publication Data

US 2003/0143994 A1    Jul. 31, 2003

(30) Foreign Application Priority Data

Nov. 16, 2000    (JP) .............................. 2000-350181

(51) Int. Cl.
*H04M 11/04* (2006.01)
(52) U.S. Cl. ............................... 455/404.2; 455/432.3; 455/415; 455/435.1
(58) Field of Classification Search ............. 455/456.1, 455/517, 414.1, 457, 404.2, 456.2, 415, 421, 455/440, 432.3, 433, 435.1; 701/213, 202, 701/207, 208
See application file for complete search history.

(56) References Cited

U.S. PATENT DOCUMENTS

| 5,721,678 A | 2/1998 | Widl |
| 6,098,048 A | 8/2000 | Dashefsky et al. |
| 6,208,866 B1 | 3/2001 | Rouhollahzadeh et al. |
| 6,611,755 B1 * | 8/2003 | Coffee et al. ............... 701/213 |
| 2003/0045301 A1 * | 3/2003 | Wollrab ..................... 455/456 |

FOREIGN PATENT DOCUMENTS

| EP | 0 752 688 A2 | 1/1997 |
| JP | 2001-312521 A | 11/2001 |
| KR | 1998-075401 | 11/1998 |
| KR | 2000-018219 | 4/2000 |

(Continued)

OTHER PUBLICATIONS

Simin, X.; Neng, N.; Jinu, C., "Mobile Terminal Positioning Technology and Service Providing Method"; *Modern Science & Technology of Telecommunications*, 2000, 1-5 (translation included).

(Continued)

*Primary Examiner*—Edward F. Urban
*Assistant Examiner*—Tu X. Nguyen
(74) *Attorney, Agent, or Firm*—Brinks Hofer Gilson & Lione

(57) ABSTRACT

Research server 4 transmits to moving status search server 3 a request for providing moving status information containing a conditional expression, designating attributes of users to be researched. Moving status search server 3 extracts users having user attribute information (information such as address, occupation or the like, of each user) matching the conditional expression and obtains location information from mobile stations 1 which the users possess. In this way, moving status search server 3 generates moving status information on the basis of location information of users having user attribute information matching the conditional expression, and transmits the generated moving status information to research server 4.

22 Claims, 16 Drawing Sheets

FOREIGN PATENT DOCUMENTS

WO          WO 00/41104          7/2000

OTHER PUBLICATIONS

Beard, K., et al, "Estimating Positions and Paths of Moving Objects" *Proceedings Seventh International Workshop on Temporal Representation and Reasoning*; Canada, Jul. 7-9, 2000, XP-002270086, total 8 pages.

Japanese Title: "Kyodai Shijou no Ichi Jouhou Service Youto ha Musuu Yagate Huoujun Tousai e", Telecommunication, Jan. 25, 2000, vol. 17, p. 126 to 129. English Translation: Masaaki Maeda., "New Analysis, Huge Market for Positional Information Services Unlimited Uses, Eventual Standardization", pp. 1 to 7.

Japanese Title: "Idou-tai Jouhou Tsuushin ni okeru GPS Riyou Service ni Tsuite", GPS Symosium (2000), Nov. 15, 2000, pp. 71 to 79. English Translation: Kenichi Shima., "Text for GPS Symposium 2000 GPS Society Japan Institute of Navigation, Section 3.1 GPS Services in Mobile Data Communication", pp. 1 to 17.

Japanese Title: "Ichi Riyou System no Katsuyou-jutsu", Material Flow, Sep. 1, 1998, vol. 39, No. 9, pp. 52 to 53. English Translation Hachirou Endoh., "Practical Course on Use of Personal Computer for Distribution Personnel", pp. 1 to 7.

* cited by examiner

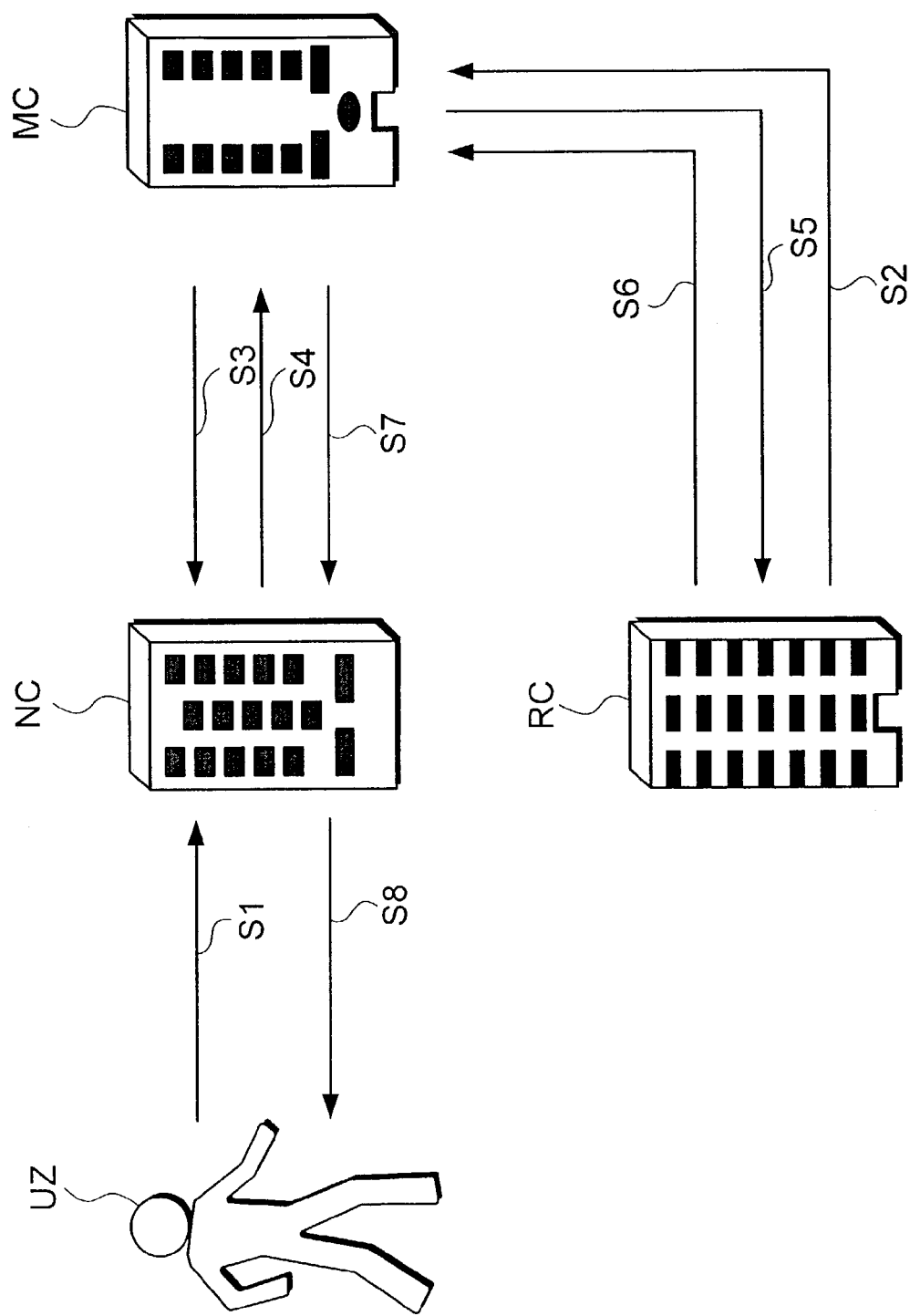

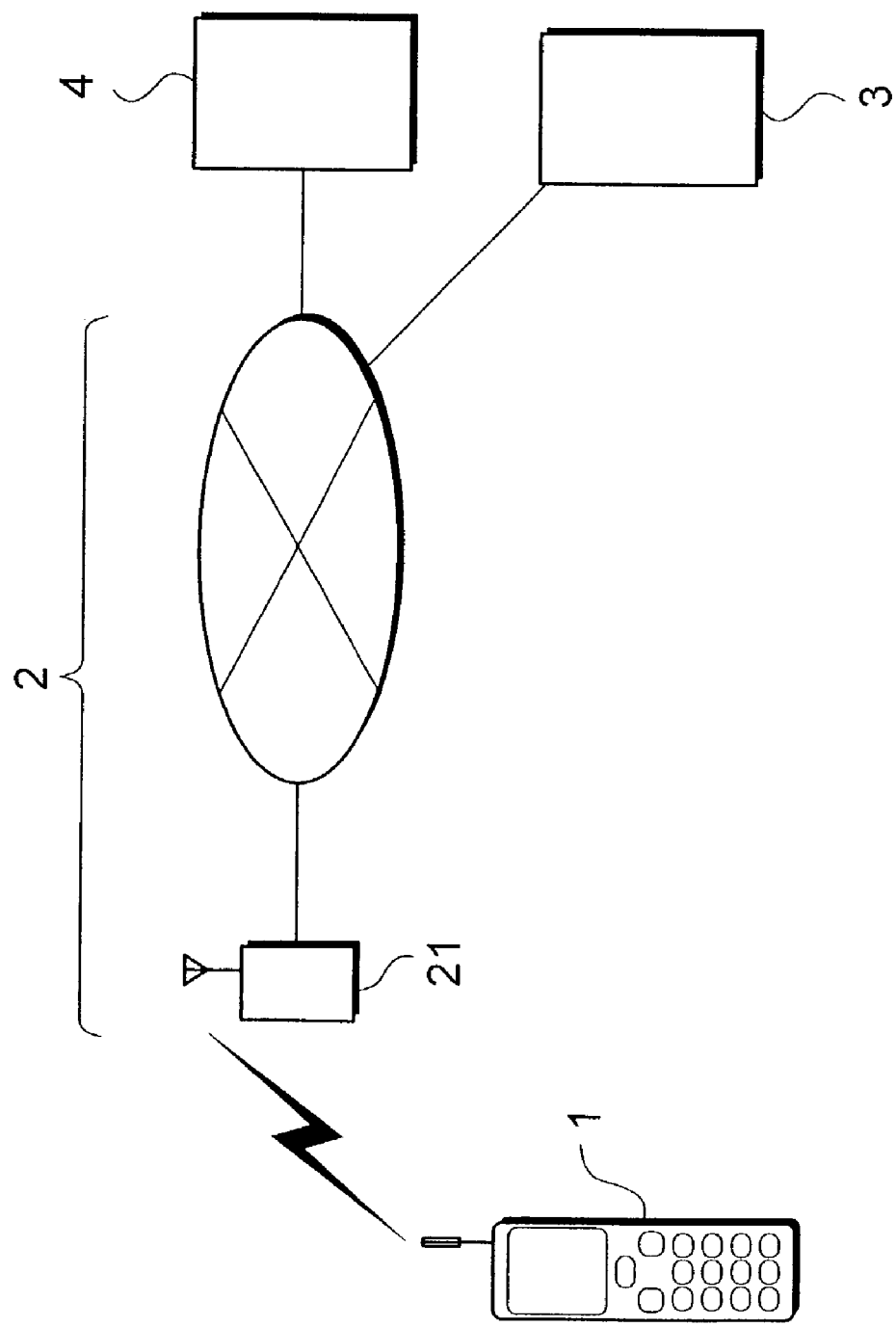

FIG. 6

| NAME OF CLIENT | REQUEST CODE | RESEARCH PERIOD | CONDITIONAL EXPRESSION |
|---|---|---|---|
| COMPANY A | #1 | 5:00 JULY 10 ~ 5:00 JULY 20 | (MALE)*(THE THIRTIES)*(TOKYO)*(OFFICE WORKER)*(POPULAR SITES) |
| COMPANY B | #2 | 5:00 JULY 11 ~ 5:00 JULY 30 | (FEMALE)*(THE TWENTIES)*(KANAGAWA PREFECTURE)*(POPULAR SITES) |
| ⋮ | ⋮ | ⋮ | ⋮ |
| ⋮ | ⋮ | ⋮ | ⋮ |

TBL1

FIG. 7

| REQUEST CODE | MOVING STATUS INFORMATION NO. 1 | MOVING STATUS INFORMATION NO. 2 | MOVING STATUS INFORMATION NO. 3 | ... |
|---|---|---|---|---|
| #1 | MOVING STATUS INFORMATION a | MOVING STATUS INFORMATION b | MOVING STATUS INFORMATION c | ... |
| #2 | MOVING STATUS INFORMATION k | MOVING STATUS INFORMATION l | MOVING STATUS INFORMATION m | ... |
| ... | ... | ... | ... | ... |

FIG. 9

| MOBILE STATION ID | USER ATTRIBUTE INFORMATION |||||||
|---|---|---|---|---|---|---|---|
| | AGE | SEX | ADDRESS | OCCUPATION | POSITION | ANNUAL INCOME | |
| MS1 | 35 | MALE | TOKYO | OFFICE WORKER | CHIEF | 7 MILLION YEN | |
| MS2 | 20 | FEMALE | CHIBA PREFECTURE | PART-TIMER | — | 3.5 MILLION YEN | |
| ⋮ | ⋮ | ⋮ | ⋮ | ⋮ | ⋮ | ⋮ | |
| ⋮ | ⋮ | ⋮ | ⋮ | ⋮ | ⋮ | ⋮ | |

| HOBBY | BUYING HABIT | | TRANSPORTATION | |
|---|---|---|---|---|
| BASEBALL | UTILITY GOODS | | CAR | ⋯ |
| MUSIC LISTENING | CLOTHES | | TRAIN | ⋯ |
| ⋮ | ⋮ | | ⋮ | ⋯ |
| ⋮ | ⋮ | | ⋮ | ⋯ |

FIG. 10

| REQUEST CODE | RESEARCH PERIOD | CONDITIONAL EXPRESSION |
|---|---|---|
| #1 | 5:00 JULY 10 ~ 5:00 JULY 20 | (MALE)*(THE THIRTIES)* (TOKYO)*(OFFICE WORKER)* (POPULAR SITES) |
| #2 | 5:00 JULY 11 ~ 5:00 JULY 30 | (FEMALE)*(THE TWENTIES)* (KANAGAWA PREFECTURE)* (POPULAR SITES) |
| ⋮ | ⋮ | ⋮ |
| ⋮ | ⋮ | ⋮ |

TBL2

FIG. 11

TBL3

| REQUEST CODE; #1 |
| --- |
| MOBILE STATION ID |
| MS1 |
| MS7 |
| ... |
| ... |

| REQUEST CODE; #2 |
| --- |
| MOBILE STATION ID |
| MS1 |
| MS9 |
| ... |
| ... |

| MOBILE STATION ID | F1: LOCATION INFORMATION OBTAINMENT FLAG |
|---|---|
| MS1 | 1 |
| MS2 | 0 |
| . . . | . . . |
| . . . | . . . |

TBL4

FIG. 13

| MOBILE STATION ID / TIME | ... | 5:00 JULY 10 | 5:10 JULY 10 | ... |
|---|---|---|---|---|
| MS1 | ... | N:30, W:20 | N:31, W:25 | ... |
| MS1 | ... | N:10, W:11 | N:15, W:11 | ... |
| ⋮ | ⋮ | ⋮ | ⋮ | ⋮ |
| ⋮ | ⋮ | ⋮ | ⋮ | ⋮ |

MOVING STATUS INFORMATION PROVIDING METHOD AND SERVER

TECHNICAL FIELD

The present invention relates to a server; and a moving status information providing method for obtaining moving status information indicating moving statuses of users of mobile stations on the basis of location information of the mobile stations, and providing other third parties with the obtained moving status information.

BACKGROUND ART

In recent years, systems for obtaining information indicating a location of a mobile station (hereinafter referred to as "location information") in various ways have steadily become commercially viable in mobile communication networks such as cellular telephones and so on. An example of such a system is as follows: On a PHS (Personal Handyphone System; registered trademark) network, the radio zone of a base station where a mobile station is at present, can be determined and location information of the mobile station can be obtained on the basis of the location of the base station. Also in use is a method for obtaining location information of a mobile station, whereby a GPS (Global Positioning System) is installed in the mobile station.

Various uses for the location information have been developed. Location information can be communicated through a network and displayed on the screen of a personal computer; or provided through facsimile in the form of an image of a map of the location.

The aforementioned location information is greatly valued due to its wide range of applicability in many situations. It is especially useful in doing related statistical research (hereinafter referred to as "research"). For example, individual corporations carry out research by questioning consumers on the street about fast-moving consumer goods, or popular sites, in order to determine ideal opening locations of a new shop or the best location for the sale of goods. In this case, if information indicating how a consumer has been moving (hereinafter referred to as "moving status information"), can be obtained by the method detailed above, and without questioning consumers on the street, research for popular sites, and fast-moving consumer goods can readily be made available.

However, moving status information contains information that is private and confidential, such as current locations and a change of location of individuals who happen to be carrying a mobile communication device. Such information when accessed and utilized by a third party without the knowledge, and approval of the carriers of mobile communication devices, it may lead to serious legal problems.

DISCLOSURE OF INVENTION

The present invention was developed against the background of the above-mentioned prior art, and provides a moving status information providing method for obtaining moving status information of users of mobile stations on the basis of location information of mobile stations, and providing organizations other than a mobile communication carrier with the moving status information while also protecting the privacy of the users; and a server.

In order to achieve this object, the present invention provides a moving status information providing method comprising: a step of obtaining location information indicating a location of a mobile station served by a mobile communication network; a step of receiving a designation of arbitrary target attribute information and a period of monitoring a moving status by a server storing, in correspondence with the mobile station, target attribute information indicating an attribute of a target carrying the mobile station; a step of generating, by the server, moving status information of the mobile station corresponding to the designated target attribute information on the basis of time series location information obtained by the mobile communication network within the designated period of monitoring; and a step of providing, by the server, moving status information generated in the step of generating moving status information, to an agent outside of the mobile communication network.

In one preferred form, the location information is generated by the mobile station and reported to the server.

In another preferred form, the location information is generated by the mobile communication network on the basis of the location of a base station serving a mobile station.

In another preferred form, the server further includes a step of registering the target attribute information of a target carrying the mobile station in correspondence with the mobile station.

In another preferred form, the server registers the target attribute information of only a user of the mobile station, who agrees to the accessing of moving status information in the step of registering target attribute information.

In another preferred form, the moving status information providing method further includes: a step of extracting, by the server, a mobile station corresponding to the target attribute information matching a condition designated from an agent outside of the mobile communication network; and in the step of obtaining location information, the mobile communication network obtains location information of the mobile station extracted by the server in the extracting step.

In another preferred form, the moving status information providing method further includes: a step of extracting, by the server, a mobile station corresponding to the target attribute information matching a condition designated from an agent outside of the mobile communication network; and a step of registering mobile station identification information for uniquely specifying the mobile station extracted by the server in the extracting step, and in the step of obtaining location information, the mobile communication network obtains location information of a mobile station corresponding to the mobile station identification information registered by the server in the step of registering mobile station identification information.

In another preferred form, the server provides in the providing step, the moving status information in a format designated by an agent outside of the mobile communication network.

In another preferred form, the server transmits the moving status information to a node outside of the mobile communication network which is capable of communicating with the server in the providing step.

In another preferred form, the server transmits in the providing step, the moving status information to a node outside of the mobile communication network which is capable of communicating with the server, and the node links the moving status information transmitted from the server with a condition designated in the extracting step.

In another preferred form, the server calls a mobile station whose location information is to be obtained, and obtains the location information from the mobile station in the step of obtaining location information.

In another preferred form, the moving status information is information showing the moving status of the target on a map.

In another preferred form, location information is presented on a map, and shows how a plurality of targets having a designated attribute converge on a certain dot on the map.

In another preferred form, information presented on the map shows which path the plurality of targets having a designated attribute move between a plurality of dots designated on the map.

In another preferred form, information presented on the map shows which path the plurality of targets having a designated attribute move in a designated area on the map.

In another preferred form, information presented on the map shows which path the plurality of targets having a designated attribute move in a designated space on the map.

In another preferred form, the user receives a return value from the owner of the server, for providing the moving status information of the designated target.

In another preferred form, the server stores a point corresponding to the value of an amount to be paid by the owner of the server to the user in correspondence with the user, and the user of the mobile station redeems the points for a service with a corresponding value offered by the server.

In another preferred form, the owner of the server is also a mobile communication carrier providing a communication service via the mobile communication network, and determines a service charge for providing the communication service through the mobile communication network, in consideration of compensation to be paid to the user of the mobile station.

In another preferred form, an owner of the server is a mobile communication carrier providing a communication service via the mobile communication network, and the owner of the server provides a service corresponding to the value of the amount to be paid to the user of the mobile station by attaching the service to the communication service.

In another preferred form, a target carrying the mobile station is a user of the mobile station.

In another preferred form, the mobile station is a cellular phone performing communication via the mobile communication network.

The present invention provides a server comprising: a storing unit which stores target attribute information indicating an attribute of a target carrying a mobile station in correspondence with the mobile station; a designation receiving unit which receives a designation of arbitrary target attribute information and a period of monitoring a moving status; a moving status information generating unit which generates moving status information of the mobile station corresponding to the designated target attribute information based on time series location information obtained by the mobile communication network within the designated period of monitoring; and a providing unit which provides moving status information generated in the step of generating moving status information to an agent outside of the mobile communication network.

In another preferred form, the location information is generated by the mobile station and reported to the server.

In another preferred form, the location information is generated by the mobile communication network on the basis of the location of a base station serving a mobile station.

BRIEF DESCRIPTION OF THE DRAWINGS

FIG. 1 is a diagram showing an outline of a moving status information providing method according to the present embodiment.

FIG. 2 is a block diagram showing a configuration of a mobile communication system according to the present embodiment.

FIG. 6 is a diagram showing request management table TBL1 according to the present embodiment.

FIG. 7 is a diagram showing the memory content of moving status information database 44 of research server 4 according to the present embodiment.

FIG. 9 is a diagram showing the memory content of user attribute information database 33 of moving status search server 3 according to the present embodiment.

FIG. 10 is a diagram showing request content storing table TBL2 according to the present embodiment.

FIG. 11 is a diagram showing request code correspondence table TBL3 according to the present embodiment.

FIG. 12 is a diagram showing location information obtainment table TBL4 according to the present embodiment.

FIG. 13 is a diagram showing the memory content of location information storing unit 35 of moving status search server 3 according to the present embodiment.

BEST MODE FOR CARRYING OUT THE INVENTION

Figure 3B:
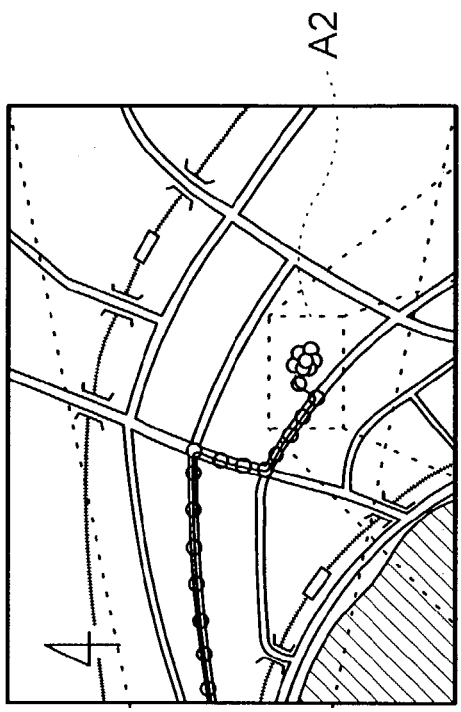
FIG. 3 is a diagram showing moving status information according to the present embodiment.

The embodiment of the present invention will be explained below with reference to the drawings. In the embodiment, the present invention is applied to a mobile communication network.

[1] First Embodiment

[1.1] Outline of Moving Status Information Providing Method According to the First Embodiment FIG. 1 is a diagram showing the outline of a moving status information providing method according to the first embodiment of the invention. The outline of the moving status information providing method according to the first embodiment will be explained as described below with reference to the drawing.

Step S1: Mobile communication carrier NC makes a contract with user UZ who enjoys a communication service of the carrier to agree to provide external organizations with moving status information (hereinafter referred to as "moving status information-providing contract"). Moving status information with which mobile communication carrier NC provides research company MC is in a user friendly form to which location information of each user UZ has been converted, and indicates a description of traffic lines of users UZ on a real map. The moving status information will be explained in detail later.

User UZ may make the moving status information-providing contract at the time he/she subscribes to the communication service of mobile communication carrier NC, or after subscribing to the communication service.

Step S2: A company RC applying for research (hereinafter referred to as "company RC") requests research company MC to research by specifying a research period, and attributes of users UZ to be researched (for example, age, sex, and so on).

Step S3: Research company MC designates attributes of users UZ corresponding to the request of company RC and asks mobile communication carrier NC to provide moving status information.

Step S4: Mobile communication carrier NC extracts users UZ with attributes matching the moving status information request of company RC, from users UZ who are under the moving status information-providing contract. Then, mobile communication carrier NC obtains the requested location information of extracted users UZ. Mobile communication carrier NC generates moving status information on the basis of the obtained location information and provides research company MC with the generated moving status information.

Step S5: Research company MC provides company RC with findings of research corresponding to the request for research on the basis of the moving status information provided by mobile communication carrier NC. Contents of the findings of the research which research company MC provides company RC are determined on the basis of the request from company RC.

For example, in a case where the content of the request for research is "researching popular sites for men in their thirties", research company MC researches what places men in their thirties visit, and how many of the men visit these places, on the basis of the moving status information provided by mobile communication carrier NC. Research company MC draws up findings of research such as popular site rankings or the like, and provides company RC with the findings of the research.

Step S6: Company RC pays research company MC a research charge in compensation for the research.

Step S7: Research company MC deducts a set commission from the research charge which research company MC has received from company RC and pays mobile communication carrier NC the commission as the moving status information providing charge. The moving status information providing charge which research company MC pays mobile communication carrier NC is set by a mutual and a free contract between them. Thus, the moving status information providing charge can be set in various manners.

For example, mobile communication carrier NC and research company MC may make a charge structure in advance and determine the moving status information providing charge on the basis of the charge structure. In this case, the moving status information providing charge which research company MC pays mobile communication carrier NC is calculated at a predetermined rate according to the quantity of information which has been provided, that is the number of persons whose moving status information is provided by mobile communication carrier NC. Thus, the amount, which, research company MC earns as a commission is derived from the following calculation: a research charge taken from company RC, minus the moving status information providing charge paid to mobile communication carrier NC.

Step S8: Mobile communication carrier NC deducts a set commission from the moving status information providing charge, which mobile communication carrier NC has received from research company MC, and divides the commission amount equally and distributes the equally divided commission to each user UZ who has provided moving status information. As methods of distributing the moving status information providing charge to users UZ, the below described methods can be employed.

1. First Method of Distributing Moving Status Information Providing Charge to Users UZ In this method, the money to be distributed to each user UZ is paid into a bank account of each user UZ.

2. Second Method of Distributing Moving Status Information Providing Charge to Users UZ In this method, the money to be distributed to each user UZ is adjusted against the communication charge for the communication service provided by mobile communication carrier NC, which each user UZ must pay. Mobile communication carrier NC adds up the amount to be paid as compensation for providing moving status information on a monthly basis with respect to each user UZ, and deletes the sum from the communication charges to be paid by each user UZ.

3. Third Method of Distributing Moving Status Information Providing Charge to Users UZ In this method, mobile communication carrier NC provides users UZ with a service, other than the communication service, corresponding in value to the compensation amount to be paid to each user UZ. One example of such a service, would be for mobile communication carrier NC to provide only users UZ providing moving status information with a special service which enables users UZ to browse their own moving status information on a monthly basis, and so on. In this case, the charge for ancillary services which are provided by mobile communication carrier NC along with the communication service such as the Internet connection service, and so on, may be deducted from the compensation amount.

4. Fourth Method of Distributing Moving Status Information Providing Charge to Users UZ In this method, each time users UZ provide moving status information; they are rewarded with redeemable points corresponding in value to the compensation amount. Users UZ may utilize these points to obtain predetermined bonuses from mobile communication carrier NC. Users UZ can obtain bonuses such as a bicycle for 300 points, a towel for 100 points and so on. These points may be redeemed for cash vouchers such as a gift coupon and so on, by converting the points to a currency amount.

The following embodiment of the present invention gives a more detailed description of the above mentioned fourth method of distributing the moving status information providing charge to each user UZ.

The foregoing is the description of the moving status information providing method according to the present embodiment. Referring to the configuration and the operation of the mobile communication system of the present embodiment explained below will deepen understanding of the moving status information providing method according to the present embodiment.

[1.2] Configuration of Mobile Communication Network (a) Configuration of Entire System FIG. 2 is a block diagram showing the configuration of a mobile communication system according to the present embodiment. As shown in FIG. 2, the mobile communication system according to the present embodiment comprises a plurality of mobile stations 1; a mobile packet communication network 2 serving mobile stations 1; a moving status search server 3; and a research server 4. For simplicity, FIG. 2 shows only one mobile station 1 among a plurality of mobile stations 1 in the system.

Mobile stations 1 are portable communication terminals such as cellular telephones and so on, served by mobile packet communication network 2. Users UZ are the carriers of mobile station 1. Using mobile station 1 enables users UZ to enjoy a packet switching service of mobile packet communication network 2, and a call service of a mobile telephone network not shown. Mobile station 1 has the function of transmitting the present location of mobile station 1, that is the present location of user UZ, to moving status search server 3 along with the usual functions of cellular telephones and so on.

Moving status search server 3 is a computer system which mobile communication carrier NC possesses. Moving status search server 3 extracts users UZ, with attributes matching a request for providing moving status information, from among users UZ who are under a moving status information-providing contract, and obtains location information of mobile stations 1 of users UZ. Then, moving status search server 3 generates moving status information on the basis of the obtained location information.

Figure 3C:
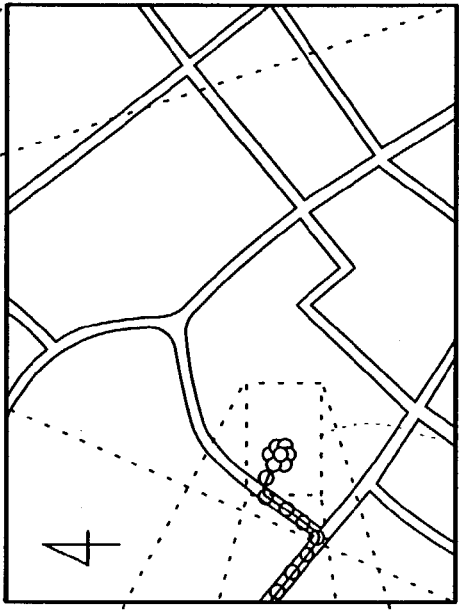
Figure 3A:
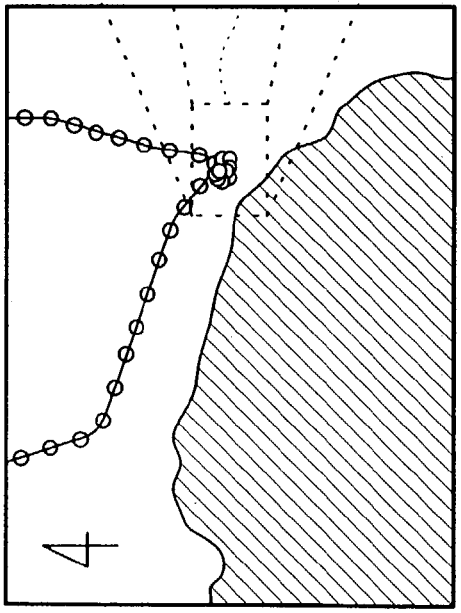
Figure 3D:
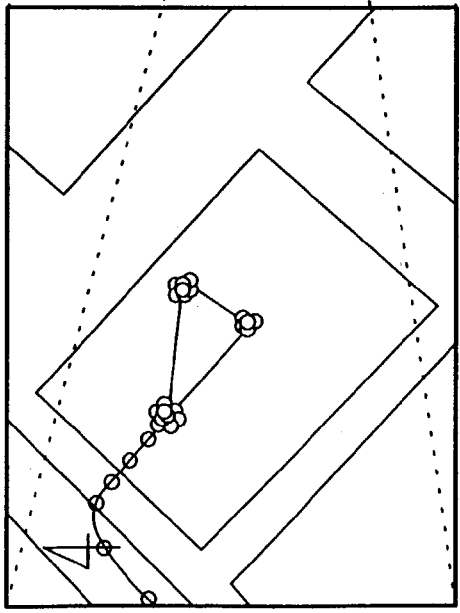

FIGS. 3A to 3D are diagrams showing moving status information. In FIGS. 3A to 3D, dots plotted on the maps correspond to location information obtained from mobile station 1 (latitude•longitude). FIG. 3B shows the detail, part A1, which is the area enclosed with a chain line on the map shown in FIG. 3A; FIG. 3C shows the detail, part A2, which is the area enclosed with a chain line on the map shown in FIG. 3B; and FIG. 3D shows the detail, part A3, which is the area enclosed with a chain line on the map shown in FIG. 3C.

Moving status search server 3 stores geographic information representing maps of each area. Moving status search server 3 plots dots on the maps on a latitude/longitude grid corresponding to location information, which has been obtained from mobile station 1. Moving status search server 3 generates moving status information shown in FIGS. 3A to 3D by connecting the plotted dots with a line. Further, moving status search server 3 transmits the generated moving status information to research server 4.

Research server 4 is a computer system, which research company MC possesses. Research server 4 of research company MC designates attributes of users UZ to be researched on the basis of a request for research from company RC, and transmits a request for providing moving status information to moving status search server 3. Research server 4 receives moving status information transmitted from moving status search server 3. Research company MC draws up findings of the research corresponding to the request for research on the basis of moving status information which research server 4 receives and provides company RC with the findings.

The configuration of moving status search server 3 and research server 4 will be explained in detail later.

Research company MC may provide company RC with the findings of the research through any of the following several methods. For example, an employee of research company MC may print out the findings of research, and personally hand over the printed findings of the research to the concerned person at company RC. Research company MC may transmit the findings of the research to a server or a terminal of company RC via a network.

(b) Configuration of Mobile Station 1

Figure 4:
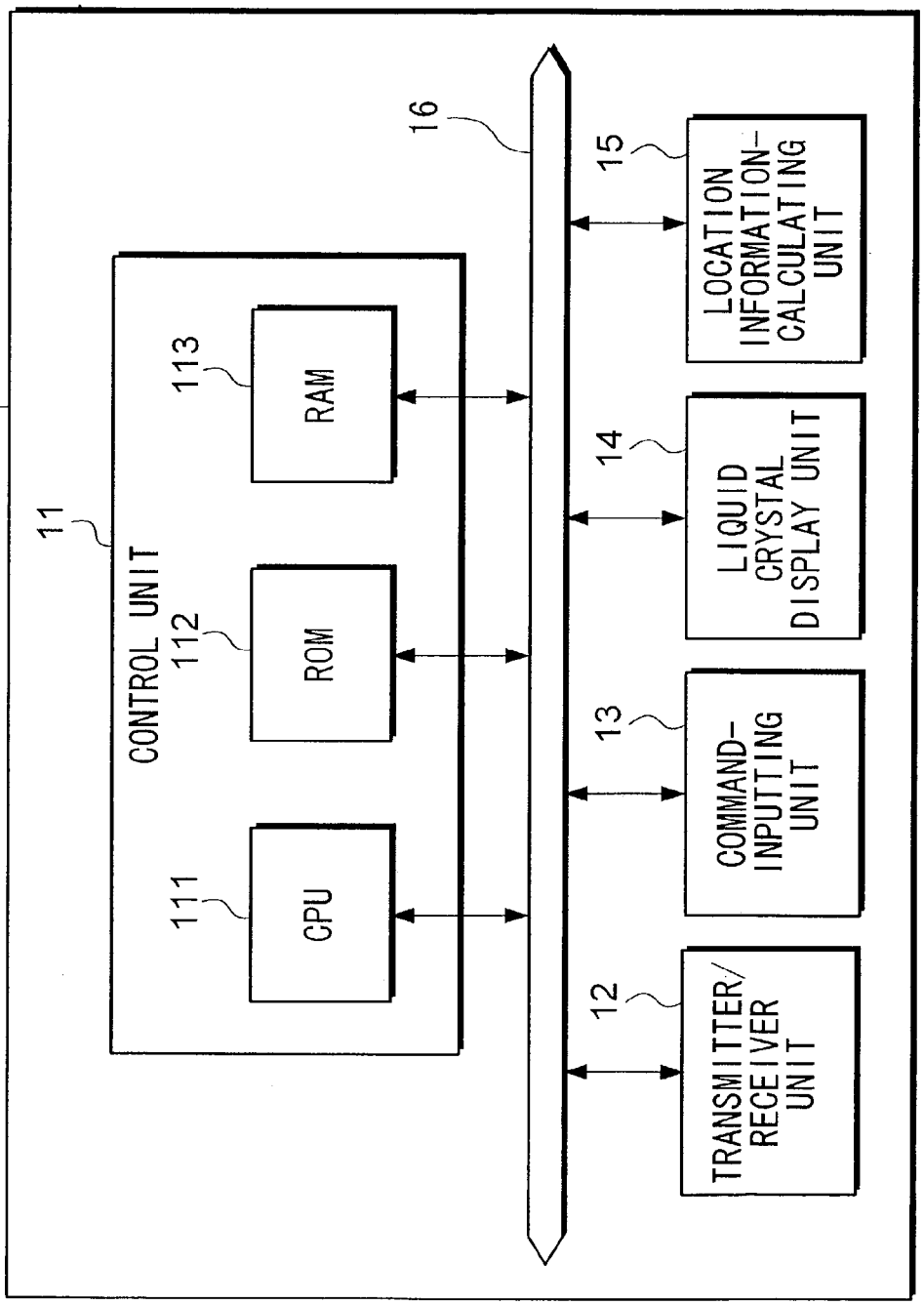
FIG. 4 is a block diagram showing a configuration of mobile station 1 according to the present embodiment.

FIG. 4 is a block diagram of the configuration of mobile station 1 according to the present embodiment.

As shown in FIG. 4, mobile station 1 comprises control unit 11; transmitter/receiver unit 12; command-inputting unit 13; liquid crystal display unit 14; location information-calculating unit 15, and bus 16, which interconnects these units.

Transmitter/receiver unit 12 performs radio communication with base station 21 of mobile packet communication network 2.

Command-inputting unit 13 comprises various buttons such as a PB (push button) and a cursor key, and provides CPU 111 of control unit 11 with operation data corresponding to the input operations of a user. CPU 111 reads the input commands of the user on the basis of the input operation data, and performs controls corresponding to the commands.

Liquid crystal display unit 14 comprises a display device such as a liquid crystal panel and so on, and displays a variety of information under the control of control unit 11.

Location information-calculating unit 15 comprises a GPS receiver not shown, which measures the latitude and longitude indicating a location of mobile station 1 on the basis of GPS signals which the GPS receiver receives, and provides location information to CPU 111 in the form of the latitude and longitude measurement.

Control unit 11 comprises CPU (Central Processing Unit) 111; ROM (Read Only Memory) 112; and RAM (Random Access Memory) 113, and controls each unit of mobile station 1. ROM 112 stores a mobile station ID for uniquely specifying mobile stations 1 in mobile packet communication network 2; a control program for controlling the whole of mobile station 1, and various control information. Moreover, ROM 112 stores a program for transmitting location information of mobile station 1 to moving status search server 3 (hereinafter referred to as "location information-reporting program").

RAM 113 is used as a work area of CPU 111.

In carrying out various processing, CPU 111 reads out various control programs, which have been stored in ROM 112 and follows procedures written in the programs. For example, when CPU 111 instructs location information-calculating unit 15 to calculate location information, CPU 111 reads out the location information-reporting program, which has been stored in ROM 112 and follows the procedure written in the program. When location information-calculating unit 15 provides location information to CPU 111, CPU 111 transmits the location information to mobile packet communication network 2 via transmitter/receiver unit 12. The location information transmitted from mobile station 1 is received by moving status search server 3 via mobile packet communication network 2.

(c) Configuration of Research Server 4

Figure 5:
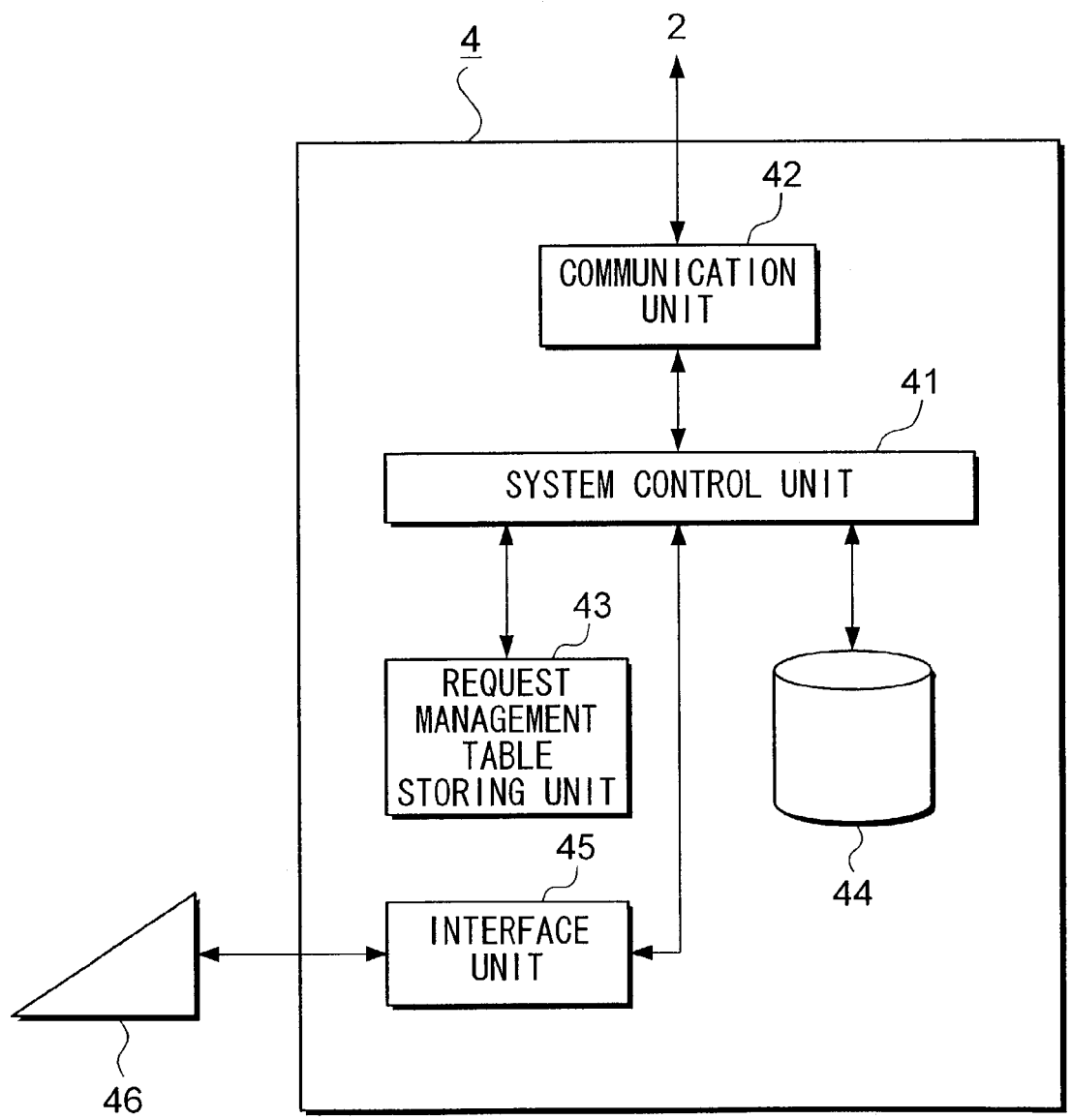
FIG. 5 is a block diagram showing a configuration of research server 4 according to the present embodiment.

FIG. 5 is a block diagram showing the configuration of research server 4 according to the present embodiment.

As shown in FIG. 5, research server 4 comprises system control unit 41; a communication unit 42; request management table storing unit 43; moving status information database 44; interface unit 45, and operation terminal 46.

System control unit 41 comprises a CPU; a ROM; a RAM and so on (not shown). ROM stores a control program for obtaining from moving status search server 3, moving status information corresponding to a request from research server 4 to moving status search server 3 to provide moving status information. CPU carries out the processing for obtaining moving status information from moving status search server 3 by carrying out the control program.

Communication unit 42 performs packet switching via mobile packet communication network 2. Research server 4 requests moving status search server 3 to provide moving status information by packet switching and receives the transmitted moving status information. Interface unit 45 mediates data transmission/reception between system control unit 41 and operation terminal 46.

Operation terminal 46 is a device such as a PC (Personal Computer) or the like, connected with research server 4. An operator of research company MC inputs into operation terminal 46, information such as, a client's name (company RC's name), a research period, and conditions of research on the basis of a request for research from company RC.

Research conditions to be inputted into operation terminal 46 are determined on the basis of requests for research from company RC. The condition of the search can take any form, which is within the technological scope of the program. For example, research conditions can be input in the form of a sentence, or a form of a conditional expression composed of a combination of keywords after extracting predetermined keywords from the contents of the request for research.

In the present embodiment, the conditional expression composed of a combination of keywords extracted from contents of the request for research will be used as the method of inputting research conditions.

For example, we assume that the content of a research request from company RC is, "popular sites for male office workers in their thirties living in Tokyo". In this case, research company MC extracts specific keywords such as "the thirties", "male", "Tokyo", "office worker", and "popular sites". The conditional expression, for example, "male", * "the thirties", * "Tokyo", * "office worker"* "popular sites" is based on these keywords. In the conditional expression "*" represents "AND condition". On the other hand, when keywords are designated by using "OR condition" such as "the thirties or the twenties" and so on, the conditional expression including "OR condition" can be made by describing "the thirties or the twenties" as (the twenties+the thirties).

Request management table storing unit 43 stores request management table TBL1 for managing contents of requests from companies RC. FIG. 6 is a diagram showing request management table TBL1. As shown in FIG. 6, request management table TBL1 stores names of clients having requested for research (here, names of companies RC), request codes corresponding to the requests, research periods corresponding to the requests, and conditional expressions of the research, so as to link them. The request codes are uniquely determined in response to requests from companies RC.

When information such as a conditional expression and so on, is inputted into operation terminal 46, system control unit 41 temporally stores inputted information in request management table TBL1. Then, system control unit 41 reads out a request code, a research period, and a conditional expression which have been stored in request management table TBL1 and transmits, to moving status search server 3, a request for providing moving status information to which all of the information mentioned above has been added.

Moving status information database 44 is a database for storing moving status information transmitted from moving status search server 3. FIG. 7 is a diagram showing the memory content of moving status information database 44. As shown in FIG. 7, moving status information database 44 stores moving status information corresponding to each request code.

When moving status information corresponding to each request for providing moving status information is transmitted from moving status search server 3, system control unit 41 stores received moving status information in moving status information database 44 in correspondence with the request code of the request for providing moving status information. Consequently, moving status information database 44 stores moving status information corresponding to each of the requests.

(d) Configuration of Moving Status Search Server 3

Figure 8:
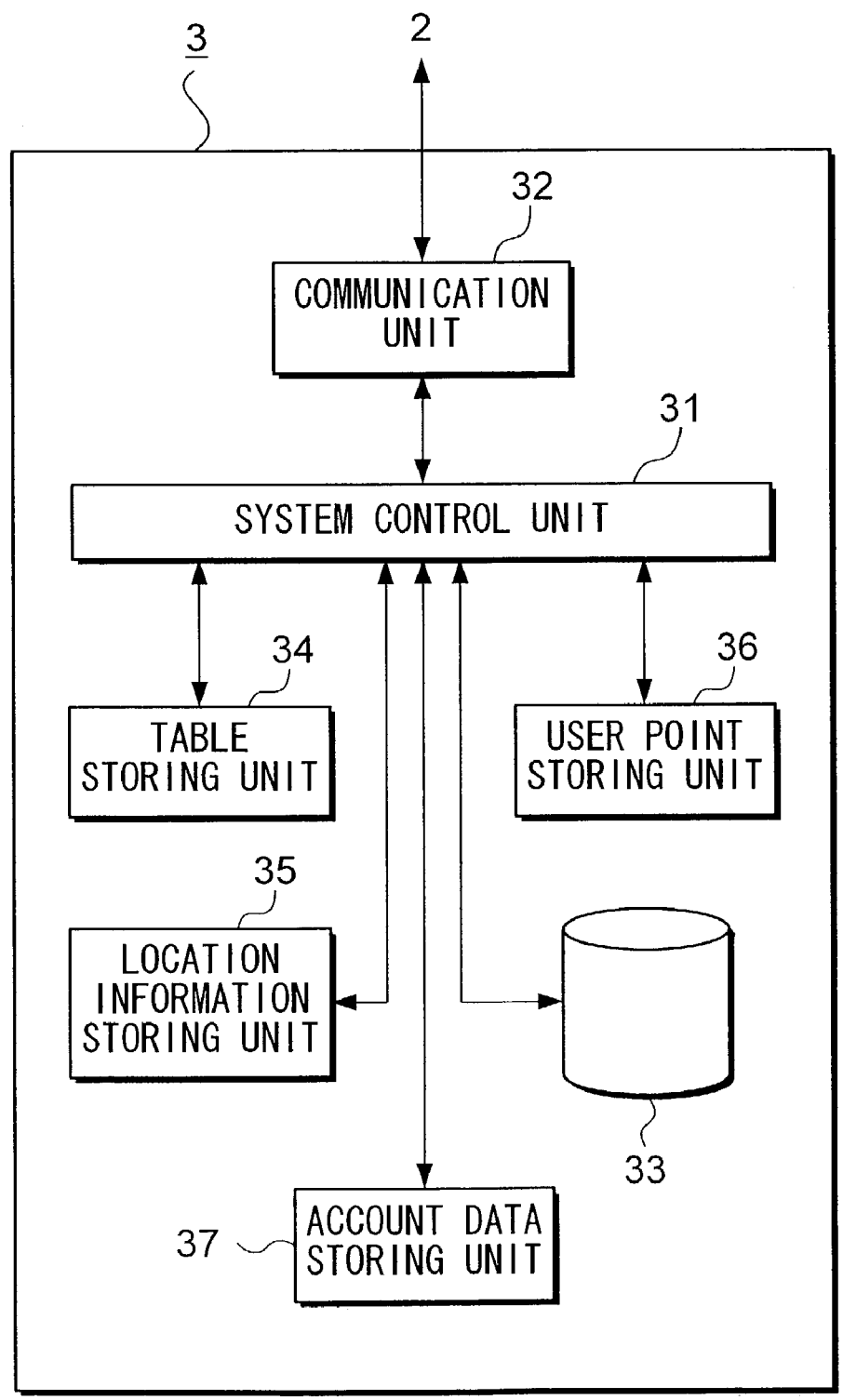
FIG. 8 is a block diagram showing a configuration of moving status search server 3 according to the present embodiment.

FIG. 8 is a block diagram showing the configuration of moving status search server 3 according to the present embodiment. As shown in FIG. 8, moving status search server 3 comprises system control unit 31; communication unit 32; user attribute information database 33; table storing unit 34; location information storing unit 35; user point storing unit 36 and account data storing unit 37.

System control unit 31 comprises a CPU; a ROM; a hard disk and so on (not shown). ROM stores the control program for obtaining location information from mobile stations 1 and generating moving status information on the basis of the location information, and providing research server 4 with the moving status information. ROM stores geographic information for generating moving status information. CPU obtains location information from mobile stations 1 and generates moving status information by carrying out the control program. Further, CPU temporally stores generated moving status information in the hard disk, reads out the moving status information and transmits the moving status information to research server 4.

User attribute information database 33 stores information of users UZ having mobile station 1 who are under the moving status information-providing contract and receive the packet switching service of mobile packet communication network 2.

FIG. 9 is a diagram showing the memory content of user attribute information database 33. As shown in FIG. 9, user attribute information database 33 stores user attribute information for each mobile station 1 of each user UZ who is under the moving status information-providing contract. User attribute information is information indicating various attributes such as age, sex, address, occupation, position, annual income, hobby, and buying habits of users etc. User attribute information which has been stored in user attribute information database 33 is collected through questionnaires which users answer in advance when making the moving status information-providing contract.

Table storing unit 34 stores various tables. These tables are used in order for system control unit 31 to obtain location information from users UZ who are under the moving status information-providing contract and carry out the processing for generating moving status information on the basis of the location information.

Various tables include request content storing table TBL2. When a request for providing moving status information is transmitted from research server 4, request content storing table TBL2 stores a variety of information added to the request. FIG. 10 is a diagram showing request content storing table TBL2. As shown in FIG. 10, request content storing table TBL2 stores a request code, a research period, and a conditional expression, which are added to the request for providing moving status information.

Moving status search server 3 transmits the generated moving status information to research server 4 after adding the request code corresponding to the moving status information. Since moving status search server 3 transmits moving status information after adding the request code to the moving status information in this manner, research server 4 can link the transmitted moving status information with contents of the request from company RC.

At this stage, moving status search server 3 does not add to moving status information, information indicating a specific user whose moving status information is provided, (for example, mobile station ID), when transmitting moving status information. Thus, moving status information can be provided to third parties other than mobile communication carrier NC while users providing moving status information are not specified. As a result, the privacy of each user UZ is protected.

Various tables stored in table storing unit 34 include a plurality of processing code correspondence tables, and a location information search table apart from request content storing table TBL2. FIG. 11 is a diagram showing request code correspondence table TBL3. FIG. 12 is a diagram showing location information obtainment table TBL4.

Each time a request for providing moving status information is transmitted from research server 4, system control unit 31 prepares request code correspondence table TBL3 to be stored in table storing unit 34. As shown in FIG. 11, request code correspondence tables TBL3 include request codes and mobile station IDs.

The mobile station IDs which have been stored in request code correspondence tables TBL3 are mobile station IDs of mobile stations 1 corresponding to user attribute information matching the conditional expression corresponding to each request code. Specifically, the request code correspondence tables TBL3 store mobile station IDs of mobile stations 1 whose moving status information is generated for each request code. Thus, moving status information of mobile stations 1 corresponding to mobile station IDs, which have been stored in request code correspondence tables TBL3 is generated in system control unit 31. System control unit 31 deletes request code correspondence tables TBL3 when system control unit 31 transmits moving status information to research server 4.

On the other hand, location information obtainment table TBL4 indicates whether each mobile station 1 is the target whose location information is to be obtained. As shown in FIG. 12, location information obtainment table TBL4 stores location information obtainment flag F1 corresponding to each mobile station 1 of each user UZ who is under the moving status information-providing contract. Location information obtainment flag F1 indicates which mobile station 1 is the target, with regard to which, the processing for obtaining location information is carried out. When location information obtainment flag F1 is "1", system control unit 31 determines that mobile station 1 is the target whose location information is to be obtained. Then, system control unit 31 carries out the processing for obtaining location information from mobile station 1. On the other hand, when location information obtainment flag F1 is "0", system control unit 31 determines that mobile station 1 is not the target whose location information is to be obtained.

Location information obtainment flags F1 which become "1" in location information obtainment table TBL4, correspond to mobile station IDs stored in each request code correspondence table TBL3. That is, targets whose location information is to be obtained are mobile stations 1 whose moving status information is obtained.

When mobile station IDs corresponding to location information obtainment flags F1 do not exist in all of the request code correspondence tables TBL3 stored in table storing table 34, by deleting request code correspondence tables TBL3, location information obtainment flags F1 can be modified from "1" to "0" by system control unit 31.

Methods of storing a variety of information in tables which have been stored in table storing unit 34 will be explained in detail later.

Location information storing unit 35 stores location information of users UZ who are under the moving status information-providing contract. FIG. 13 is a diagram showing the memory content of location information storing unit 35. As shown in FIG. 13, location information storing unit 35 stores, for each mobile station 1 of each user UZ who is under the moving status information-providing contract, location information of the user UZ and the times when the location information is obtained.

System control unit 31 obtains location information at predetermined intervals (for example, at intervals of 10 minutes) from mobile stations 1 whose location information obtainment flag F1 are "1" in location information obtainment table TBL4. System control unit 31 stores the obtained location information in location information storing unit 35 and records the time when the location information is obtained in location information storing unit 35. At this stage, system control unit 31 extracts a mobile station ID from the transmitted location information and records the location information in the place of location information storing unit 35 corresponding to the mobile station ID. The location information of each mobile station 1 which has been stored in location information storing unit 35 in this manner is deleted in order of decreasing duration of its entry. Location information is deleted when location information obtainment flag F1 corresponding to the mobile station ID of mobile station 1 is modified from "1" to "0", or when the oldest research period corresponding to request codes expires.

Methods by which system control unit 31 obtains location information from mobile stations 1, can be as follows: System control unit 31 calls mobile station 1 and obtains location information; or mobile station 1 may determine to transmit location information to moving status search server 3 and so on. In the present embodiment, we assume that system control unit 31 calls mobile stations 1 and obtains location information.

User point storing unit 36 stores accredited points of each user UZ.

Account data storing unit 37 stores account data corresponding to a moving status information providing charge for each research company MC, which is under the contract of providing moving status information. Each time moving status search server 3 sends moving status information to research server 4, the account data is updated by accumulating the account data according to a predetermined charge structure of the moving status information providing charge.

[1.3] Operation of Mobile Communication System

The operation of the mobile communication system according to the present embodiment will be explained below with reference to the drawings. The operation of the present embodiment will be explained below in the following order. (1) the operation of receiving requests for research from company RC, (2) the operation of obtaining location information, (3) the operation of generating and providing moving status information.

(1) Operation of Receiving Requests for Research from Company RC

First, company RC requests research company MC to conduct research. The research request may take many forms. For example, a research person of company RC may request an employee of research company MC to research by telephone or by electronic mail. Further, the research person of company RC requests the employee of research company MC to research through an interview with the employee.

In case the content of the request for research from company RC is "popular sites for male office workers in their thirties living in Tokyo", an operator of research company MC inputs a conditional expression such as "male", * "the thirties", * "Tokyo", * "office worker"* "popular sites" along with the name of company RC (for example, "company A") according to the content of the request. At this stage, data such as "July 10, 5:00 to July 20, 5:00" is inputted as a research period.

When the operator performs the input operation in this manner, system control unit 41 of research sever 4 determines, for example, "#1" as a request code corresponding to the client's name, the research period, and the conditional expression. Then, system control unit 41 stores the request code, client's name, research period, and conditional expression in request management table TBL1 of request management table storing unit 43. As a result, the memory content of request management table TBL1 of research server 4 becomes the one shown in FIG. 6. System control unit 41 transmits, to moving status search server 3, a request for providing moving status information to which the request code, the research period, and the conditional expression are added from among a variety of information which has been stored in request management table TBL1.

Figure 14:
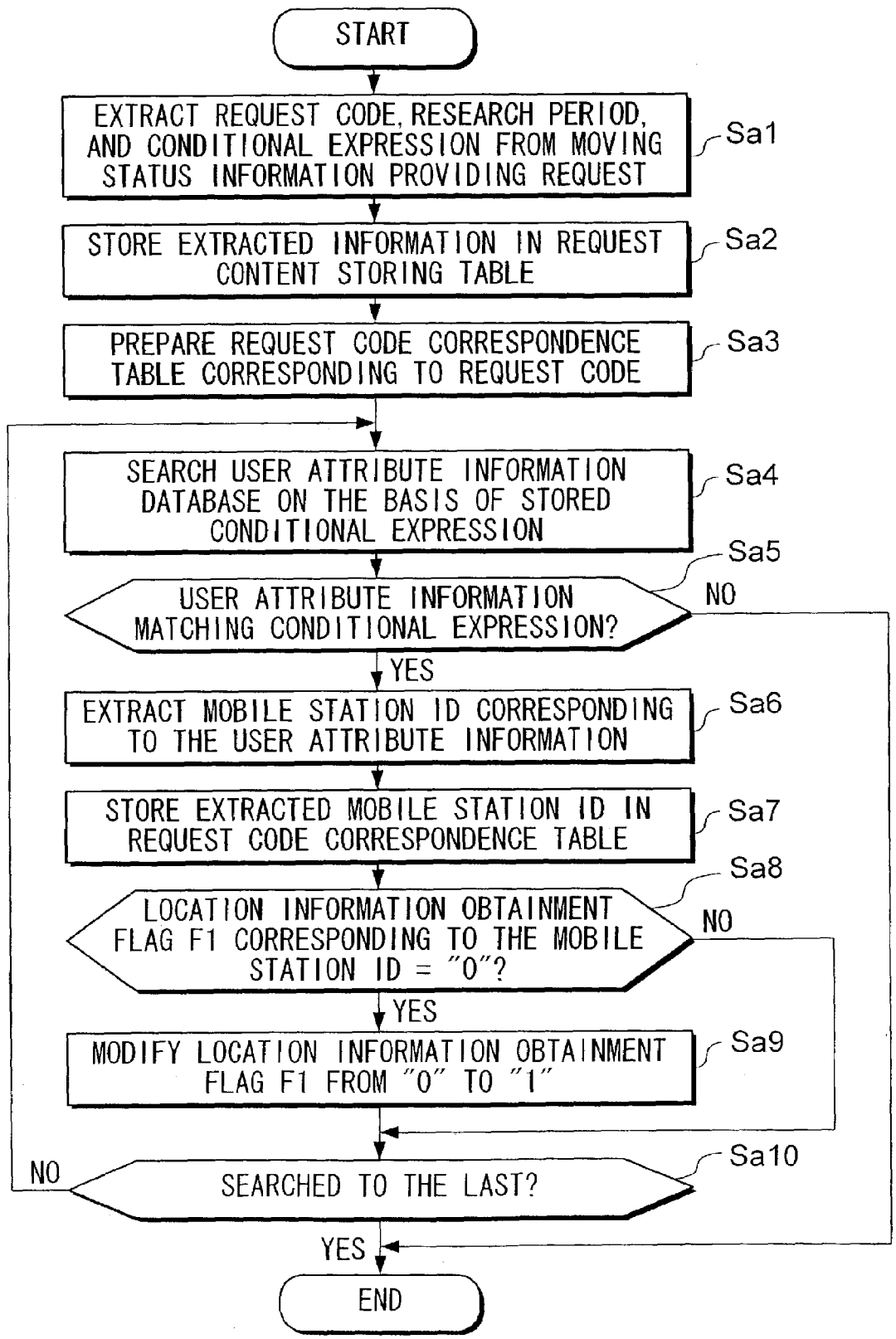
FIG. 14 is a flowchart showing the processing of moving status search server 3 according to the present embodiment when a request for providing moving status information is transmitted from research server 4.

Next, the request for providing moving status information transmitted from research server 4 is received by communication unit 32 of moving status search server 3 and transmitted to system control unit 31. When the request for providing moving status information is transmitted to system control unit 31, the processing shown in the flowchart of FIG. 14 is carried out by system control unit 31.

First, system control unit 31 extracts the request code, the research period, and the conditional expression, which have been added to the request for providing moving status information transmitted from research server 4 (step Sa1). Further, system control unit 31 stores extracted information in request content storing table TBL2, which has been stored in table storing unit 34 (step Sa2). As a result, request content storing table TBL2 stores the same information as the one which has been stored in request management table TBL1 of research server 4 other than the client's name.

Next, system control unit 31 prepares, in table storing unit 34, request code correspondence table TBL3 corresponding to request code "#1", which has been stored in request content storing table TBL2 (step Sa3).

After request code correspondence table TBL3 is prepared in this manner, system control unit 31 searches user attribute information database 33 according to the conditional expression (in this case, "male", * "the thirties", * "Tokyo", * "office worker"* "popular sites") which has been stored in request content storing table TBL2 (step Sa4). In case the user attribute information matching the conditional expression is found not to exist as a result of the search, the determination in step Sa5 in system control unit 31 becomes "No" and the processing comes to an end.

On the other hand, in case the user attribute information matching the conditional expression is found to exist as a result of the search in step Sa5 ("Yes"), system control unit 31 extracts mobile station IDs corresponding to the user attribute information (step Sa6). For example, in case the memory content of user attribute information database 33 is such as the one shown in FIG. 9, user attribute information corresponding to mobile station ID "MS1" is found as user attribute information matching the conditional expression. In this case, system control unit 31 determines that mobile station 1 corresponding to mobile station ID "MS1" is the target whose moving status information is generated, and extracts mobile station ID "MS1" (step Sa5, Sa6). Further, system control unit 31 stores the extracted mobile station ID "MS1" in request code correspondence table TBL3 which has been made in step Sa3 (in this case, request code correspondence table TBL3 corresponding to the request code "#1") (step Sa7).

Next, system control unit 31 determines whether location information obtainment flag F1 corresponding to mobile station ID "MS1" is "0" in location information obtainment table TBL4 (step Sa8). In case the result of the determination in step Sa8 location information obtainment flag F1 corresponding to mobile station ID "MS1" is "1" ("Yes"), system control unit 31 does not modify location information obtainment flag F1 and the processing proceeds to step Sa10.

On the other hand, in case the result of the determination in step Sa8 location information obtainment flag F1 corresponding to mobile station ID "MS1" is "0" ("No"), system control unit 31 modifies location information obtainment flag F1 to "1", and the processing proceeds to step Sa10 (step Sa9).

When the processing proceeds to step 10 in this manner, system control unit 31 determines whether it has completed searching for any user attribute information, which has been stored in user attribute information database 33. In case the search has been completed (step Sa9 "Yes"), system control unit 31 concludes the processing. On the other hand, in the instance where the search has not been completed, system control unit 31 determines mobile station 1 whose moving status information is to be obtained by repeatedly carrying out the processing of steps Sa4 to Sa10.

(2) Operation for Obtaining Location Information

Figure 15:
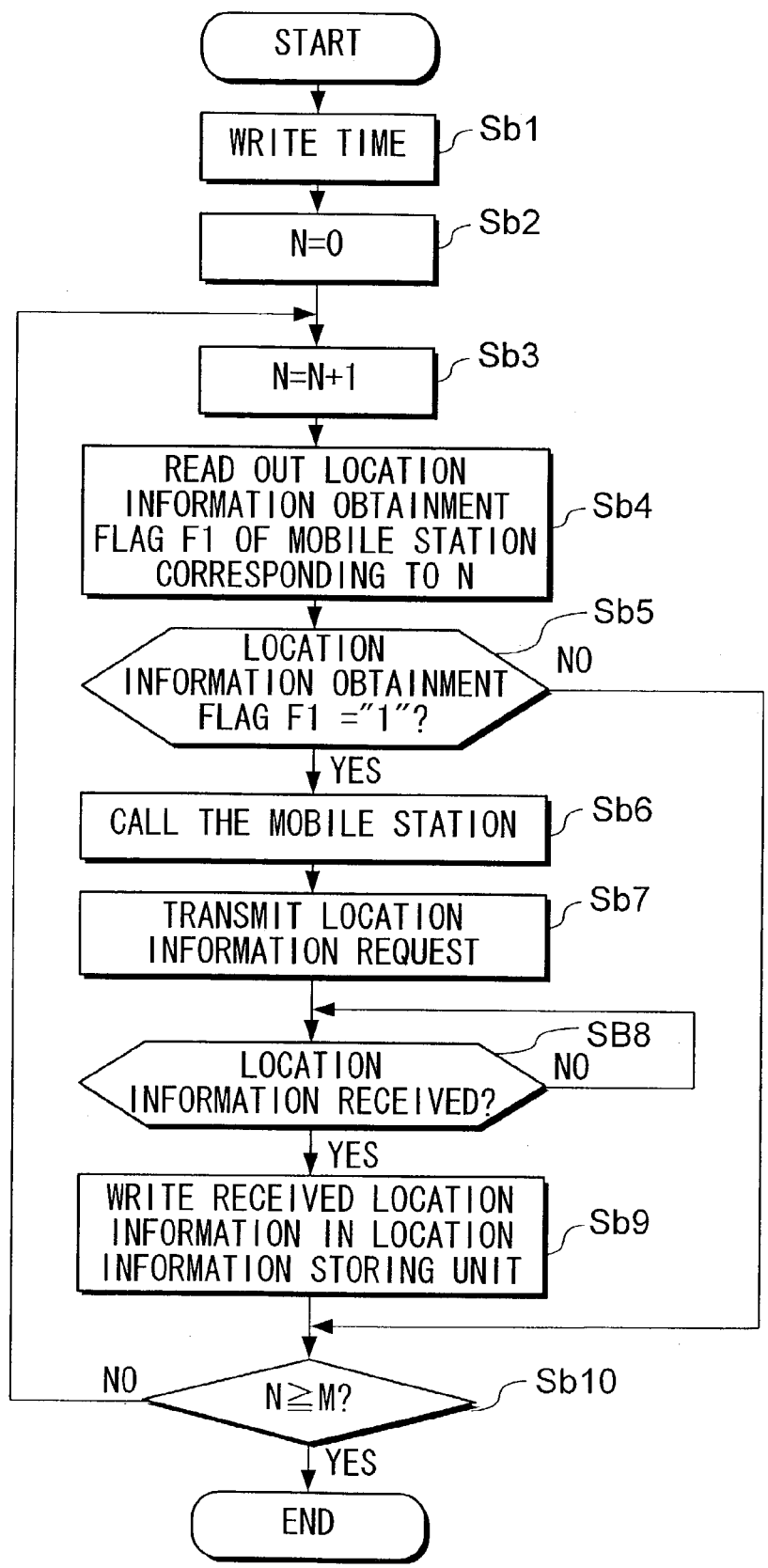
FIG. 15 is a flowchart showing the processing of moving status search server 3 according to the present embodiment in obtaining location information.

Next, as illustrated in FIG. 15, the operation for obtaining location information will be explained. This processing is performed by system control unit 31 of moving status search server 3 at certain intervals independent of the aforementioned operation in receiving requests for research from company RC.

In FIG. 15, "M" indicates the number of users UZ who are under the moving status information-providing contract, including user attribute information which has been stored in user attribute information database 33. "N" corresponds to each mobile station ID, which has been stored in location information obtainment table TBL4. For example, when "N" is "1", the mobile station ID "MS1" is the target of the processing. And when "N" is "2", the mobile station ID "MS2" is the target of the processing. The content of FIG.

12 is the same as that of the content of location information obtainment table TBL4 as explained below.

First, system control unit 31 writes the time when it started the processing in location information storing unit 35 (step Sb1). After setting a value of "N" up as "0", system control unit 31 increments "N" by only "1" (step Sb2, Sb3). After making "N" into "1" in this manner, system control unit 31 reads out location information obtainment flag F1 corresponding to mobile station ID "MS1" in location information obtainment table TBL4 (step Sb4).

Next, system control unit 31 determines whether the value of location information obtainment flag F1 corresponding to the mobile station ID "MS1" is "1" or not (step Sb5). In this case, since location information obtainment flag F1 corresponding to mobile station ID "MS1" is "1", system control unit 31 determines "Yes" in step Sb5. System control unit 31 identifies mobile station 1 corresponding to mobile station ID "MS1" as the target whose location information is to be obtained and carries out the processing of calling mobile station 1 corresponding to mobile station ID "MS1" (step Sb6).

Next, system control unit 31 transmits a request for location information to mobile station 1 (step Sb7). Until location information is transmitted from mobile station 1, system control unit 31 is on standby (step Sb8). When the request for location information transmitted from moving status search server 3 is received by mobile station 1, CPU 111 reads out aforementioned location information-reporting program from ROM 112 and instructs location information-calculating unit 15 to calculate location information. Location information-calculating unit 15 transmits calculated location information to CPU 111. CPU 111 transmits location information transmitted from location information-calculating unit 15 in this manner to mobile packet communication network 2 through transmitter/receiver unit 12.

On the other hand, system control unit 31 of moving status search server 3, upon receiving location information transmitted from mobile station 1, determines "Yes" in step Sb8. Then, the processing proceeds to step Sb9. System control unit 31 writes received location information in the place of location information storing unit 35 corresponding to mobile station ID "MS1" (step Sb9).

After the location information is written, system control unit 31 determines whether the value of "N" exceeds the value of "M" (step Sb10). Because "N=1" in this example, system control unit 31 carries out step Sb3 and increments the value of "N" by only "1". Further, system control unit 31 reads out location information obtainment flag F1 corresponding to mobile station ID "MS2" (step Sb4).

Next, system control unit 31 determines whether the value of location information obtainment flag F1 corresponding to mobile station ID "MS2" is "1" or not (step Sb5). Since location information obtainment flag F1 corresponding to mobile station ID "MS2" is "0" in this example, system control unit 31 determines "No" in step Sb5. As a result, system control unit 31 identifies mobile station 1 corresponding to mobile station ID "MS2" as the target whose location information is not obtained (step Sb5). System control unit 31 determines that the value of "N" does not exceed the value of "M" in step Sb10, carries out step Sb3 again, and increments the value of "N" by only "1".

Hereinafter, the processing similar to the foregoing is repeated, when the processing corresponding to all mobile station IDs which have been stored in location information obtainment table TBL4 comes to an end; and the value of "N" is equal to the value of "M" (step Sb10 "Yes"), system control unit 31 concludes the processing.

(3) Operation of Generating and Providing Moving Status Information

Next, the operation of generating and transmitting moving status information will be explained as FIG. 16. The processing is performed by system control unit 31 when a research period which has been stored in request content storing table TBL2 of moving status search server 3 expires. Thus, the processing is not carried out until the research period expires.

Figure 16:
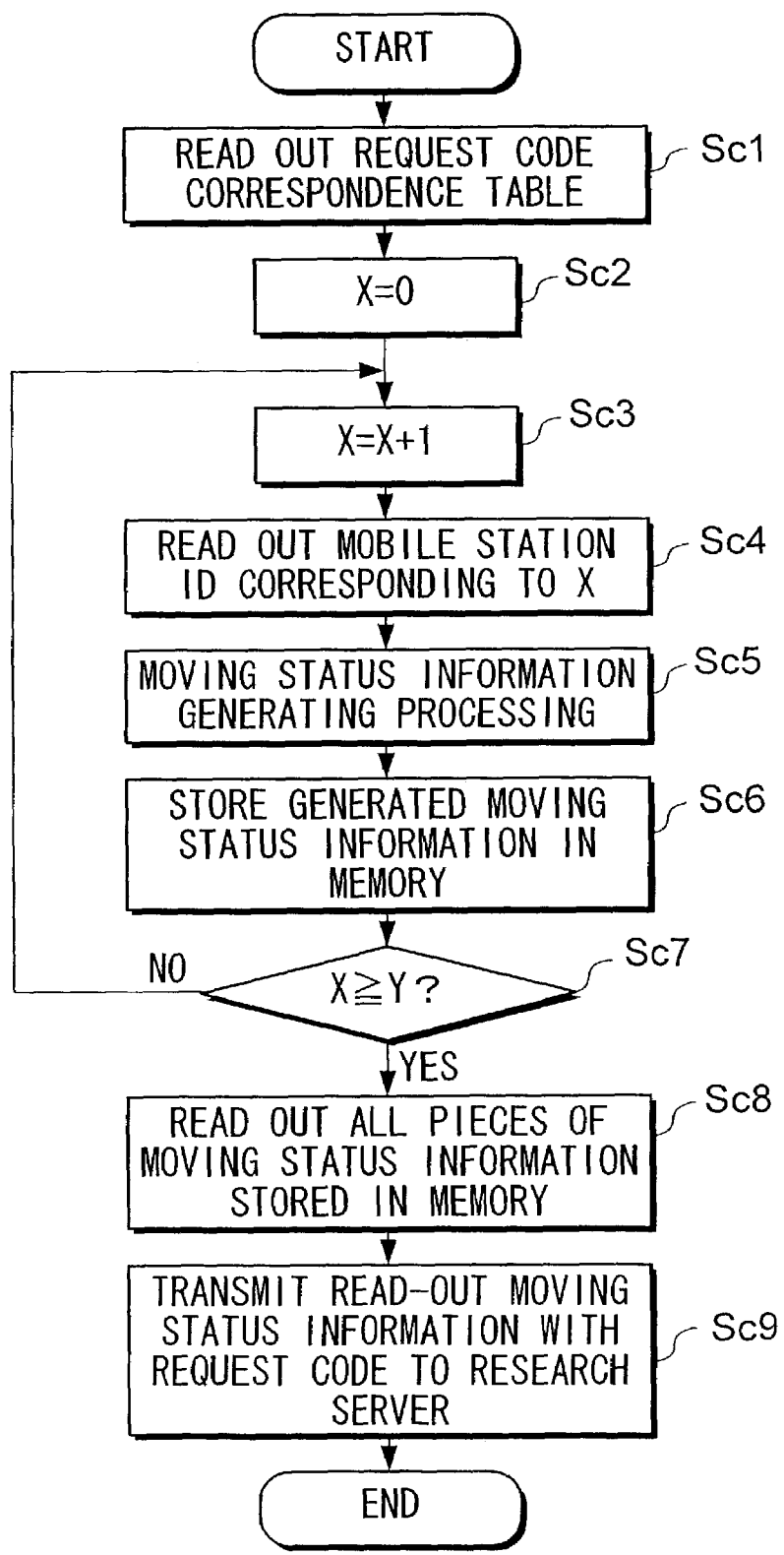
FIG. 16 is a flowchart showing the processing of moving status search server 3 according to the present embodiment in generating moving status information and transmitting moving status information.

"Y" in FIG. 16 indicates the number of mobile station IDs, which have been stored in request code correspondence table TBL3 to be processed. On the other hand, "X" corresponds to each mobile station ID, which has been stored in request code correspondence table TBL3. The foregoing will be explained more specifically as follows. First, we assume that request code correspondence table TBL3, which is the target of the processing of generating moving status information has the same content as request code "#1" shown in FIG. 11. In this assumption, when "X" is "1", mobile station ID "MS1" is the target of the processing. When "X" is "2", mobile station ID "MS7" is the target of the processing. To explain more specifically, we assume that the research period corresponding to request code "#1" expires and the content of request content storing table TBL2 and of request code correspondence table TBL3 is the same as the one shown in FIGS. 10 and 11.

First, system control unit 31 reads out request code correspondence table TBL3 corresponding to request code "#1" from table storing unit 34 (step Sc1). After reading out request code correspondence table TBL3 in this manner, system control unit 31 seeks the number of mobile station IDs, which have been stored in request code correspondence table TBL3 and determines the value of "X" and "Y".

Next, after making the value of "X" into "0", system control unit 31 increments "X" by only "1" (step Sc2, Sc3). Setting "X" up as "1" in this manner, system control unit 31 reads out the mobile station ID corresponding to "X=1", that is mobile station ID "MS1", in request code correspondence table TBL3 corresponding to request code "#1" (step Sc4).

Next, system control unit 31 determines that mobile station 1 corresponding to mobile station ID "MS1" is the target whose moving status information is generated and carries out the processing of generating moving status information of mobile station 1 corresponding to mobile station ID "MS1" (step Sc5).

The following processing is carried out in the processing of generating moving status information.

(i) System control unit 31 reads out the research period corresponding to request code "#1" in request content storing table TBL2.

(ii) System control unit 31 reads out location information, which has been obtained within the research period out of location information corresponding to the mobile station ID which has been stored in location information storing unit 35. Then, system control unit 31 plots dots on a latitude/longitude grid corresponding to the location information represented by the aforementioned geographic information.

(iii) System control unit 31 connects the dots plotted on a map with a line in the order of decreasing earliness to describe a traffic line on the map.

After a generation of moving status information corresponding to mobile station ID "MS1" has been completed in this manner, system control unit 31 writes the generated moving status information on the hard disk which it comprises (not shown) (step Sc6). Further, system control unit 31 determines whether the value of "X" exceeds the value of "Y" (step Sc7). As "X=1" in this example, system control unit 31 carries out step Sc3 to increment the value of "X" by only "1".

System control unit 31 repeats the processing described above (steps Sc3 to Sc7) until the value of "X" is equal to the value of "Y" (step Sc7 "Yes"), that is until the processing corresponding to all mobile station IDs which have been stored in request code correspondence table TBL3 has been completed. As a result, the moving status information of all users UZ having user attribute information matching the conditional expression corresponding to request code "#1" transmitted from research server 4, is generated and transmitted to the hard disk (not shown) in system control unit 31.

Next, system control unit 31 reads out moving status information of each user UZ, which has been stored on the hard disk (step Sc8). Further, system control unit 31 adds request code "#1" to each moving status information which has been read out and sequentially transmits to research server 4, moving status information to which the request code has been added (step Sc9).

Next, system control unit 31 adds account data corresponding to a moving status information providing charge to account data of account data storing unit 37. At this stage, a set commission is deducted from the moving status information providing charge and the balance is divided among all users who have provided moving status information. Then, points corresponding to the divided amount are added to each user's account in user point storing unit 36.

On the other hand, in research server 4, moving status information of each user UZ transmitted from moving status search server 3 is sequentially received by communication unit 42 and transmitted to system control unit 41. Next, system control unit 41 stores received moving status information in moving status information database 44. At this stage, system control unit 41 stores each moving status information in correspondence with each other on the basis of request code "#1" added to the moving status information.

When moving status information is stored in moving status information database 44 in this manner, moving status information can be referred to by means of operation terminal 46 of research company MC. Specifically, when information such as a client's name, request code, and so on is inputted by means of operation terminal 46, system control unit 31 reads out the conditional expression corresponding to the information from request management table TBL1; displays the conditional expression on the display of operation terminal 46; and displays a list of moving status information which has been stored in moving status information database 44. In this situation, when an operator operates operation terminal 46, he/she can display each moving status information on the display or print out each moving status information by using a printer connected to operation terminal 46.

Research company MC draws up information corresponding to a request for research from company RC by using moving status information which has been stored in moving status information database 44 and provides company RC with information corresponding to the request as the findings of research. The findings of research provided to company RC may take many forms of presentation. For example, when the content of the request of research is "popular sites for male office workers in their thirties living in Tokyo", research company MC may draw up reports such as "popular site rankings" on the basis of obtained moving status information and visit company RC to hand in the report. Research company MC may submit to company RC research information drawn up on the basis of moving status information contained in various storage medias. Further, research company MC may transmit research information to the concerned person at company RC by electronic mail and so on.

(1) Effects of Embodiment

As described above, in the present embodiment, conditions are designated on the basis of a request for research from a company and moving status information of users having attributes matching the conditions are provided to a research company. Thus, the research company can draw up findings of research corresponding to the request for research from the company without the aid of questionnaires for which it is necessary to expend on manpower.

In the present embodiment, moving status information is generated in a moving status search server, which a mobile communication carrier possesses, and in the process of providing the moving status information, the identity of the users who provide the moving status information are not revealed to the research company. Thus, the mobile communication carrier can provide the research company with moving status information while also protecting the privacy of each user.

Moving status information corresponding to only users who are under the moving status information-providing contract is provided to the research company in the present embodiment. Thus, information of users who do not want to provide their own moving status information can be prevented from leaking out, and making the contract in providing moving status information can effectively prevent problems from arising subsequently.

In the present embodiment, paying compensation for providing moving status information on to users in the form of money or the like, can become an incentive to users to make the moving status information-providing contract.

Moving status search server 3 obtains location information from mobile stations 1 at certain intervals in the present embodiment; however, the timing of obtaining the information may be set at irregular intervals.

In the present embodiment, attributes of users included in user attribute information which moving status search server 3 has are explained with reference to the attributes shown in FIG. 9. However, user attribute information is naturally not limited to these attributes and may include other attributes.

[1.4] Modifications

<Modification 1>

An operator of research company MC inputs a conditional expression and so on, corresponding to a request for research from company RC into operation terminal 46 of research server 4 in the present embodiment. However, in the instance where company RC possesses a computer system, it is naturally possible to input a conditional expression and so on by means of the computer system and transmit the request for research to research server 4 via mobile packet communication network 2.

In this case, if the conditional expression and a research period is inputted by means of the computer system which company RC possesses, the computer system transmits to research server 4 its own address (for example, telephone number, or IP address), and a request for research to which the inputted conditional expression and a research period are added. System control unit 41 of research server 4 specifies a client's name on the basis of the address of the computer system of company RC added to the received request for research and stores information such as the conditional expression added to the request for research and so on, along with the client's name in request management table TBL1.

When company RC possesses the above described computerized system for conducting research, the research information can be provided via mobile packet communication network 2.

In this case, the computer system of company RC does not need to directly communicate with mobile packet communication network 2. For example, when the computer system is connected to the Internet, the computer system communicates with mobile packet communication network 2 via the Internet. In this case, it is recommended that a relay device having a function of converting communication protocols be installed between the two networks, the Internet and mobile packet communication network 2.

<Modification 2>

In the present embodiment, research server 4 is connected to mobile packet communication network 2 and moving status information is transmitted from moving status search server 3 to research server 4 via mobile packet communication network 2. However, moving status search server 3 may be connected to research server 4 by a common carrier leased line. Mobile packet communication network 2 may be connected to the Internet in which research server 4 is installed.

<Modification 3>

In the present embodiment, moving status search server 3 generates moving status information corresponding to each mobile station 1 (that is, each user) whose moving status information is generated, and provides research server 4 with the moving status information. In other words, in the present embodiment, the number of items of moving status information to be generated is equal to the number of mobile stations 1 which have been extracted as targets whose moving status information is obtained. Then, the moving status information is provided by moving status search server 3 to research server 4. On the other hand, moving status search server 3 may display moving statuses relating to all mobile stations 1 on one map (i.e. generate one moving status information) and provide research server 4 with the moving status information.

In this case, if each mobile station 1 is plotted with a different color on the map, it would clarify the changes occurring in the moving status of each mobile station 1.

The changes in the moving status may be described by adding figures or characters to dots plotted on the map.

In the case of certain parts of the map in which a plurality of plotted dots overlap, the number of overlapping dots (i.e. the number of users in the location of plotted dots) can be specified by changing the size and the color of the dots. And to further clarify, a table showing the number of users in the location of the overlapping dots, the age and gender of each user may be added to the aforementioned dots. In this case, each dot is assigned a number. A table showing the number of users corresponding to each number assigned to the dots and the age and the gender of each user along with their moving status information may be provided.

In the present embodiment, the moving status information which moving status search server 3 provides research server 4, is the same as the moving status of users indicated on a map. However, information with which moving status search server 3 provides research server 4 is not limited to this form and may take other forms which are obtained on the basis of location information.

For example, in plotting dots on the latitude/longitude grid corresponding to each item of location information on a map, the time of obtaining the location information corresponding to each dot can be added to the dots. At this time, for example, the moving directions of users may be also be specified by the use of arrows.

If research server 4 possesses geographic information, it is recommended that moving status search server 3 when transmitting moving status information to research server 4, transmit only the course of traffic= taken by a user. In this case, system control unit 41 of research server 4 can obtain the same information as in FIG. 3 by overlapping the geographic information contained in system control unit 41, with the moving status information which has been transmitted from moving status search server 3. In this case, the moving status information of all mobile stations 1 can be described by single traffic lines. And the traffic lines of each mobile station 1 may be distinguished on the basis of the color of the traffic line. In the case of the parts on a map in which a plurality of traffic lines overlap, the overlapping traffic lines whose numbers correspond to the numbers of users who passed through the location,) can be indicated by changing the width and color of the overlapping lines.

At this stage, it becomes possible to indicate the direction of movement of each mobile station 1 by representing the directions by an arrow or the like on each traffic line. Moreover, moving status information of each user UZ can be described in a tabular form. In this case, a table shows the location information of users UZ and the times of obtaining the location information.

In the aforementioned modification, the moving status information of users can be provided while protecting the privacy of the users as the moving status information which moving status search server 3 provides research server 4 does not carry any identifying information regarding specific users, for example, the mobile station ID, or the like.

<Modification 4>

In the present embodiment, location information which moving status search server 3 obtains from mobile stations 1 is obtained by using the GPS function of mobile stations 1. However, location information may also be obtained by other methods. For example, location information may be obtained by using what is called a "three-points measurement" system, or by using location registration signal information registered in the service control station (not shown) of mobile packet communication network 2 to specify base station 21 serving mobile stations 1 in mobile packet communication network 2.

The location registration signal information is obtained as described below. First, mobile station 1 receives a beacon signal transmitted over "perch channels" from base station 21 and returns its own mobile station ID as response signal for the beacon signal. Base station 21 adds its own base station ID to the mobile station ID transmitted from mobile station 1 and transmits the mobile station ID to which the base station ID is added to the service control station (not shown). As a result, the mobile station ID and the base station ID of base station 21 serving mobile station 1, are registered as location registration signal information.

Moving status search server 3 obtains the base station ID of base stations 21 serving each mobile station 1 from the service control station and obtains location information on the basis of the obtained base station ID. At this stage, moving status search server 3 obtains location information of each mobile station 1 from the location of base station 21 corresponding to the obtained base station ID.

<Modification 5>

The mobile communication system of the present embodiment may operate as described in the following examples.

(a) Increase in Users of Vending Machines

For example, we may take a case where vending machines are installed. In this case, if the vending machine is installed in the location carrying the busiest pedestrian traffic and toward the direction in which goods displayed are conspicuous, it is expected that sales from the vending machine will increase. At this stage, the mobile communication system can be used to estimate the most appropriate location and the direction for installing the vending machine. The following operation of the mobile communication system is recommended in the case.

First, data indicating the address of the predetermined site where the vending machine will be installed is inputted into operation terminal 46. Moving status search server 3 identifies the base station ID corresponding to the data transmitted from operation terminal 46 and obtains location information of mobile stations 1 whose response signals include their base station ID. At this stage, the service control station stores all histories of location information of each mobile station 1 and transmits the histories to moving status search server 3. Moving status search server 3 generates moving status information from the obtained location information and maps the generated moving status information on a map.

When moving status information is mapped on a map in this manner, the location carrying the busiest pedestrian traffic and the direction in which most pedestrians move can be visually represented. This indicates that a plurality of users designated by attributes converge on a certain dot on the map. Thus, a dot on a map meeting a certain condition can be estimated by using the mobile communication network of the present modification (a).

The foregoing explains the instance where a certain dot on a map is estimated as a result of obtaining moving status information. Furthermore, by setting a certain dot on a map as a control point, the moving status information can be used to estimate how people gather at the control point. More specifically, in order to obtain information indicating which path customers of a certain restaurant take most frequently, to come to the restaurant, it is recommended that data indicating the address of the location of the restaurant be inputted as a search condition, and the moving status information of mobile stations 1 around this address be obtained. Thus, moving status information can be used to estimate the location where advertisements on the street such as distribution of leaflets can be made most effectively.

(b) Increase in Students of Cram, or 'Additional Study' Schools

Next, we assume that a cram school is looking to set up an advertisement. In this case, it is desirable to obtain moving status information indicating which path students coming out of their day school take to their nearest bus stop or railway station. At this stage, the mobile communication system of the present modification (b) can be used.

In this case, it is recommended that data indicating the location of the school and data indicating the location of the station be inputted into operation terminal 46. Users having the attribute of being a student are selected out of users having mobile stations 1. The content described in the present modification (a) applies correspondingly to operations other than the operation described above. Thus, moving status information of mobile stations 1 around the school and the station can be drawn up.

As a result, moving status information indicating which path students take from their school to the station or the bus stop, can be generated. The most effective location for setting up the sign or placing advertisements can be visually represented on the basis of the moving status information. In other words, it is possible to determine how users UZ having a certain attribute move between a plurality of points designated on a map by using moving status information.

(c) Safety Management and Traffic Control in Events

For example, we assume that a summer fireworks display is being held. Since a lot of people attend such an event, traffic jams can occur around the place where the event is held, causing traffic accidents due to misinformation and confusion. In this situation, the mobile communication system of the present modification can be used for traffic control or safety management in and around the place where the event is being held.

So, the address indicating a predetermined area, for example, the name of the town or village, is inputted as a condition into operation terminal 46. The content described in the present modification (a) applies correspondingly to operations other than the operation described above. Thus, location information of mobile stations 1 in a wider area can be obtained. In other words, it is possible to determine how users having a certain attribute move in the designated area on a map on the basis of the moving status information accessed through the mobile communication system of the present modification (c).

As a result, traffic conditions in and around the place where the event is held can be known, and the mobile communication system in effect can help achieve better traffic control, as well as guide pedestrians to the location of the event.

Since moving status search server 3 of the present modification obtains the base station ID of base stations 21 serving each mobile station 1 at certain intervals from the service control station, locations of spectators and paths of the movement of spectators can be determined concurrent to the happening.

(d) Tourist Information

For example, well known tourist information regarding popular sightseeing places given on a map can be taken as reference when drawing up moving status information on various converging points of people of a certain town. The mobile communication system of the present modification (d), is able to grasp the moving statuses of mobile stations 1 in a wider area in comparison to the above mentioned modification (c).

In this case, the address indicating a predetermined area covering a wider geographic location such as a prefecture, or a city can be designated as a condition inputted into operation terminal 46. The content described in modification (a) applies correspondingly to operations other than the operation described above.

When moving status information obtained in this manner is mapped on a map, it is possible to visually grasp the locations where people converge in a wider area.

In various examples described in the present modification, moving status information drawn up on the basis of location information may be mapped on a map, and the moving status information may be the one in which a plurality of obtained location information are mapped on one map in chronological order. Various examples described in the present modification can be realized through a method of obtaining location information using the GPS explained in the embodiment.

<Modification 6>

In the present embodiment, research company MC requests mobile communication carrier NC to provide moving status information on the basis of a request for research from company RC. However, mobile communication carrier NC may serve as research server 4 by adding the function of research server 4 to moving status search server 3, and also perform the operations of research company MC.

<Modification 7>

In the present embodiment, research company MC requests mobile communication carrier NC to provide moving status information on the basis of a request for research from company RC. However, company RC may directly request mobile communication carrier NC to provide moving status information. In this case, company RC may serve as research server 4 and mobile communication carrier NC may draw up the findings of the research by adding the function of research server 4 to moving status search server 3.

<Modification 8>

In the present embodiment, user attribute information of users UZ of mobile stations 1 is stored in user attribute information database 33 of moving status search server 3. However, the user attribute information may be stored in mobile packet communication network 2.

In this case, when user UZ of mobile station 1 subscribes to the communication service of mobile packet communication network 2, user attribute information of user UZ is registered in the service control station (not shown) of mobile packet communication network 2. Moving status search server 3 searches user attribute information registered in the service control station for user attribute information matching a conditional expression transmitted from research server 4 in generating moving status information. It becomes possible to generate moving status information by obtaining location information of mobile stations 1 of users UZ pinpointed as a result of the search.

<Modification 9>

In the present embodiment, moving status information of only users UZ who are under the moving status information-providing contract is provided to research company MC. However, moving status information of all users UZ may be provided to research company MC without making the particular contract of providing information. In this case, it would be necessary to secure the user's agreement to the possibility of moving status information being used for any purpose, in exchange for availing of the packet switching of mobile packet communication network 2.

<Modification 10>

In the present embodiment, moving status search server 3 receives a moving status information providing charge and passes the moving status information providing charge on to users UZ of mobile stations 1. However, a method which may bypass the paying of the moving status information providing charge to users can also be considered.

If the moving status information providing charge received from research company MC covers the running costs of mobile communication carrier NC, the income may be so utilized; but in exchange, the use of mobile packet communication network 2 can be free of charge.

<Modification 11>

In the present embodiment, users of all mobile stations 1 are the targets whose moving status information is obtained. However, the targets whose moving status information is obtained need not be limited to people, and may also include animals or objects.

For example, if a small device having the same function as mobile stations 1 is attached to animals (i.e. as a collar), the ecology of animals can be researched. In this case, the small device is attached to targets randomly selected from all species of animals existing on earth. Then, according to requests from research organizations (i.e. to research the ecology of great egrets), it is possible to obtain the corresponding moving status information.

For example, if a device having the same function as mobile stations 1 is attached to automobiles, such as taxis and so on, moving statuses and so on of the automobile can be obtained.

<Modification 12>

In the present embodiment, geographic information can be generated by obtaining the latitude/longitude of location information of mobile stations 1. Alternatively, it is also possible to install the function of calculating not only latitude/longitude but also the altitude in location information-calculating unit 15 of mobile stations 1 so as to obtain the altitude as location information.

Thus, system control unit 31 of moving status search server 3 can determine the location of a building and on which floor of a building a user is located. As a result, it becomes possible to obtain a three-dimensional, and a more detailed moving status information. In other words, according to the present modification, it is possible to determine which path users who fulfill a required set of attributes take when passing through a designated space on a map.

<Modification 13>

The present embodiment describes an instance, where a person carrying mobile station 1 (i.e. a user of mobile station 1) and a person making the moving status information-providing contract (i.e. the owner of mobile station 1) is the same individual. However, it is also possible that the two persons are different individuals.

For example, the president of a certain company may distribute mobile stations 1 to company employees and permits the use of the mobile stations. In this case the moving status providing contract is made between the employee and the company, and the president of the company in turn, makes the moving status information-providing contract with mobile communication carrier NC. Mobile communication carrier NC, upon receiving moving status information, passes the moving status information providing charge to the president of the company, that is, the owner of mobile stations 1. The president of the company may choose to allocate the passed charge to the communication service charges of mobile stations 1 distributed to the employees who are the users of mobile stations 1. In this manner, it is possible to make the moving status information-providing contract even if the owner and the user of a mobile station are not the same individual.

<Modification 14>

In the present embodiment, research company MC generates moving status information according to the conditions inputted by company RC and draws up findings of research on the basis of moving status information. However, research company MC may also serve as company RC and concurrently perform operations which include selection of targets and items to be researched to drawing up the findings of research. In other words, it does not matter what modification of form the present invention may take, as long as moving status information is drawn up on the basis of location information of mobile stations 1 provided by moving status search server 3, and the information can be utilized for making statistical determinations. Thus, it becomes possible to use the findings of the research in providing certain services which research company MC provides, or to resell the findings of the research to other companies.

As explained above, the invention enables the obtaining of moving status information of a user of a mobile station on the basis of location information of a mobile station and providing organizations other than a mobile communication carrier with the moving status information while protecting the privacy of the user. Furthermore, the present invention makes it possible to keep a track of the movements of people who choose to carry mobile stations, by maintaining a record of moving status information, which is location information of a user of a mobile station obtained within a specific period of time.

The invention claimed is:

1. A moving status information providing method performed by a server providing moving status information, comprising:
    storing attribute data of users of mobile stations in association with identifiers of the mobile stations;
    receiving a moving status information request including attribute data and moving status monitoring period data;
    searching for identifiers of one or more mobile stations associated with the attribute data included in the received moving status information request, and storing the searched identifiers of mobile stations in association with the moving status monitoring period data included in the moving status information request;
    obtaining location information of the mobile stations whose identifiers are stored at predetermined intervals, and storing the obtained location information in a chronological order in accordance with the identifiers of the mobile stations;
    determining whether a moving status monitoring period indicated by the stored moving status monitoring period data has expired;
    reading out, if determining that the moving status monitoring period has expired, the identifiers of the mobile stations stored in association with the moving status monitoring period data, and generating moving status information on the basis of location information of the mobile stations which is stored in the third memory and which has been obtained within the moving status monitoring period; and
    providing the generated moving status information.

2. A moving status information providing method according to claim 1, wherein,
    said location information is generated by said mobile stations.

3. A moving status information providing method according to claim 1, wherein,
    the mobile stations are mobile stations served by a mobile communication network; and
    said location information is generated on the basis of locations of base stations serving said mobile station.

4. A moving status information providing method according to claim 1, wherein,
    storing attribute data comprises storing attribute data of only users of mobile stations who agree to provide location information.

5. A moving status information providing method according to claim 1, wherein,
    receiving a moving status information request comprises receiving data on a format of moving status information in addition to attribute data and moving status monitoring period data; and
    providing the generated moving status information comprises providing moving status information in a format indicated by the data on the format of the moving status information.

6. A moving status information providing method according to claim 1, wherein,
    the server is served by a mobile communication network; and
    providing the generated moving status information comprises providing moving status information to a node located outside of the mobile communication network.

7. A moving status information providing method according to claim 1, wherein:
    the server is served by a mobile communication network;
    receiving the moving status information request comprises receiving the attribute data the and moving status monitoring period data from a node located outside of the mobile communication network;
    providing the generated moving status information comprises providing the moving status information to the node; and
    the method further comprises storing, by the node, the moving status information in accordance with the attribute data.

8. A moving status information providing method according to claim 1, wherein,
    obtaining location information comprises calling the mobile stations and obtaining the location information from the mobile stations.

9. A moving status information providing method according to claim 1, wherein,
    said moving status information is information showing a moving status of users of one or more mobile stations on a map.

10. A moving status information providing method according to claim 9, wherein,
    the moving status information shown on the map shows how the users of one or more mobile stations converge at a certain point on said map.

11. A moving status information providing method according to claim 9, wherein,
    the information shown on said map shows which path the users of one or more mobile stations use to move between a plurality of points designated on said map.

12. A moving status information providing method according to claim 9, wherein,
    the information shown on said map shows which path the users of one or more mobile stations use to move within an area designated on said map.

13. A moving status information providing method according to claim 9, wherein,
    the information shown on said map shows which path the users of one or more mobile stations use to move within a space designated on said map.

14. A moving status information providing method according to claim 1, further comprising providing credit points for provision of location information to users of mobile stations whose location information is obtained.

15. A moving status information providing method according to claim 14, wherein providing credit points comprises:

storing credit points in a fourth memory for each user providing location information; and providing a service corresponding to a number of credit points stored in the fourth memory to the users of mobile stations.

16. A moving status information providing method according to claim 14, wherein:

an owner of said server is a mobile communication carrier providing a communication service via a mobile communication network; and providing credit points comprises determining, by the owner of the server, a charge for a communication service used on the mobile communication network for the users of mobile stations in consideration of provisions of location information.

17. A moving status information providing method according to claim 14, wherein:

an owner of said server is a mobile communication carrier providing a communication service via a mobile communication network; and providing credit points comprises providing, by the owner of the server, a service in return for a provision of location information to the users of mobile stations in addition to the communication service.

18. A moving status information providing method according to claim 1, wherein, the users of the mobile stations are owners of the mobile stations.

19. A moving status information providing method according to claim 1, wherein, said mobile stations are cellular phones performing communication via a mobile communication network.

20. A server, comprising:

a first memory which stores attribute data of users of mobile stations in association with identifiers of the mobile stations;

a receiving unit which receives a moving status information request including attribute data and moving status monitoring period;

a second memory;

a search unit which searches the first memory for identifiers of one or more mobile stations associated with the attribute data included in the moving status information request received by the receiving unit, and stores the searched identifiers of mobile stations in the second memory in association with the monitoring status monitoring period data included in the moving status information request received;

a third memory;

a location information obtaining unit which obtains location information of the mobile stations whose identifiers are stored in the second memory at predetermined intervals, and stores the obtained location information in the third memory in a chronological order in accordance with the identifiers of the mobile stations;

an expiration determining unit which determines whether a moving status monitoring period indicated by the moving status monitoring period data stored in the second memory has expired;

a moving status information generating unit which reads out, if it is determined by the expiration determining unit that the moving status monitoring period has expired, the identifiers of the mobile stations stored in the second memory in association with the moving status monitoring period data, and generates moving status information on the basis of location information of the mobile stations which is stored in the third memory and which has been obtained within the moving status monitoring period; and a sending unit which sends the moving status information generated by the moving status information generating unit.

21. A server according to claim 20, wherein, said location information is generated by said mobile station.

22. A server according to claim 20, wherein, the mobile stations are mobile stations served by a mobile communication network; and said location information is generated in said mobile communication network on the basis of a location of base stations serving said mobile stations.

* * * * *

UNITED STATES PATENT AND TRADEMARK OFFICE
CERTIFICATE OF CORRECTION

PATENT NO. : 7,130,611 B2
APPLICATION NO. : 10/311640
DATED : October 31, 2006
INVENTOR(S) : Keisuke Kimura et al.

It is certified that error appears in the above-identified patent and that said Letters Patent is hereby corrected as shown below:

On the Title Page

Item (75), replace "Hino" with --Tokyo--.

Item (75), replace "Ichikawa" with --Chiba--.

Item (75), replace "Kunitachi" with --Tokyo--.

In the Claims

In column 26, claim 7, line 22, after "the attribute data" replace "the and" with --and the--.

Signed and Sealed this

Twenty-seventh Day of April, 2010

David J. Kappos
*Director of the United States Patent and Trademark Office*